United States Patent [19]
Tsuchihashi et al.

[11] Patent Number: 5,326,615
[45] Date of Patent: Jul. 5, 1994

[54] HONEYCOMB CORE PANEL STRUCTURE

[75] Inventors: Toshifumi Tsuchihashi, Tokyo; Kenzo Suzuki, Hino, both of Japan

[73] Assignees: The Yokohama Rubber Co., Ltd.; Hino Motors, Ltd., both of Tokyo, Japan

[21] Appl. No.: 5,140

[22] Filed: Jan. 15, 1993

[30] Foreign Application Priority Data

Jan. 16, 1992 [JP] Japan .................................. 4-005812

[51] Int. Cl.$^5$ ................................................ B32B 3/12
[52] U.S. Cl. ................................. 428/116; 52/806; 296/191; 296/211; 296/214; 428/119; 428/120; 428/138; 428/158; 428/172
[58] Field of Search ............... 428/116, 119, 120, 172, 428/158, 133; 52/806; 296/211, 214, 191

[56] References Cited

FOREIGN PATENT DOCUMENTS 1417297 10/1965 France .................................. 428/116

Primary Examiner—Ellis P. Robinson
Assistant Examiner—Nasser Ahmad
Attorney, Agent, or Firm—Finnegan, Henderson, Farabow, Garrett & Dunner

[57] ABSTRACT

A honeycomb core panel structure for use for instance as a lining or roofing in an automobile. The panel structure has cavities or pockets for receiving lamps or other fittings and includes an upper support plate member, a lower support plate member and an intermediate support plate member interposed between the upper and lower plate members and defining a bottom wall of each pocket. The lower support plate member has reinforcing extensions extending a predetermined distance into the region of the pockets.

4 Claims, 1 Drawing Sheet

HONEYCOMB CORE PANEL STRUCTURE

BACKGROUND OF THE INVENTION

1. Field of the Invention

This invention relates generally to structural wall materials, particularly a honeycomb panel structure having pockets for receiving lamps and the like and a method of making the same.

2. Prior Art

Honeycomb cores have heretofore found extensive application for their inherent advantages of being lightweight and high mechanical strength. Typically, panel or board members comprised of honeycomb cores made of aluminum, steel or other core materials have been widely used for instance as a lining in the interior of an automobile which is provided with cavities or pockets for receiving lamps or other fittings.

A conventional form of such honeycomb panels or boards is shown in FIG. 2 of the accompanying drawings in which a web of honeycomb core 100 is covered on both sides adhesively with surfacing plate members 101 and 102. The upper plate member 101 extends linearly throughout the length of the web across the region of pockets 103 formed at predetermined positions and intervals. The lower plate member 102 extends linearly over pocket-free straight surface regions Xa, Xa but is bent to run in conformity with the configuration of each pocket 103 having a length Xb. This prior art device has a drawback in that its fabrication is complicated and time-consuming and further in that the corner region C of the pocket 103 is susceptible to localized stresses.

SUMMARY OF THE INVENTION

With the foregoing drawbacks in view, the present invention seeks to provide a honeycomb panel structure which is relatively easy to make and which is structurally strong.

This and other features and advantages of the invention will appear clear from the following detailed description taken in conjunction with the accompanying drawings.

According to the invention, there is provided a honeycomb panel structure which comprises a web of honeycomb core having pockets formed at predetermined locations and intervals, an upper support plate member extending linearly over the upper surface of the web, a lower support plate member extending over the lower surface of the web in parallel spaced relation to the upper support plate member and an intermediate support plate member interposed between the upper and lower support plate members and extending over and defining a bottom wall of each of the pockets, the lower support plate member having reinforcing extensions extending from opposite directions a predetermined distance into each of the pockets.

DETAILED DESCRIPTION OF THE INVENTION

Figure 1:
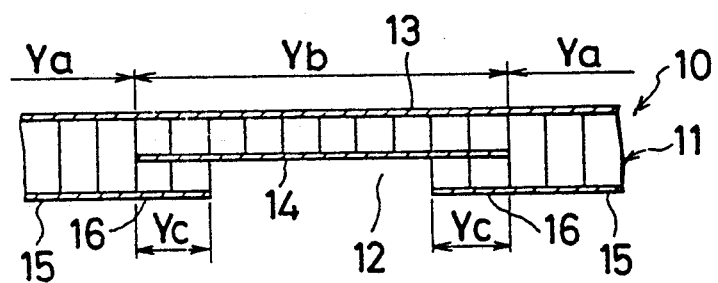
FIG. 1 is a diagrammatic segmentary cross-sectional view of a honeycomb panel embodying the invention.
Figure 2:
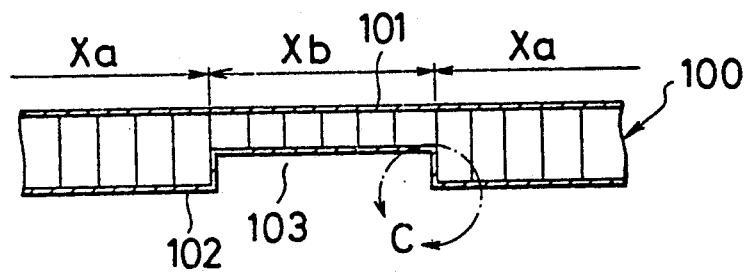
FIG. 2 is a diagrammatic segmentary cross-sectional view of a prior art counterpart.

Referring now to FIG. 1, there is shown a segment of a honeycomb panel or board structure 10 which comprises a web of honeycomb core 11 formed from a steel, aluminum or other core materials, and having downwardly open cavities or pockets 12 formed at predetermined locations and intervals, an upper surface support plate member 13 extending linearly over a given area of the panel 10 including pocket regions Yb and pocket-devoid regions Ya and adhesively or otherwise bonded to the upper surface of the honeycomb core 11, an intermediate support plate member 14 extending in parallel relation with the upper support plate member 13 over the region Yb of each of the pockets 12 and adhesively bonded to the web of honeycomb core 11 and defining the bottom wall of the pockets 12, and a lower surface support plate member 15 extending in parallel spaced relation to the upper support plate member 13 and adhesively bonded to the lower surface of the honeycomb core 11.

According to an important aspect of the invention, the lower surface support plate member 15 has reinforcing extensions 16 extending from opposite directions a predetermined distance Yc into the pocket region Yb and underlying in superposed parallel relation to the intermediate support plate member 14. The distance Yc or the length of the reinforcing extension 16 is preferably greater than 50 mm, more preferably greater than 100 mm, though dependent upon the dimension of the pocket 12. The provision of reinforcing extensions 16 precludes the necessity of bending or otherwise shaping the lower plate member 15 to conform with the configuration of the pocket 12, thus rendering it possible to manufacture honeycomb core panel products at increased efficiency and accuracy. The presence of such reinforcements 16 protects the pockets 12 against deformation or damage.

Obviously, various modifications and variations of the present invention are possible in the light of the above teaching. It is therefore to be understood that within the scope of the appended claims the invention may be practiced otherwise than as specifically described.

What is claimed is:

1. A honeycomb panel structure comprising a web of honeycomb core having downwardly opening pockets therein formed at predetermined locations and intervals, an upper support plate member extending linearly over an upper surface of said web, a lower support plate member extending over a lower surface of said web in parallel spaced relation to said upper support plate member, said lower support plate having openings therein at said predetermined locations forming the openings of each of said pockets, and an intermediate support plate member located between and spaced from said upper and lower support plate members and extending over and defining a bottom wall of each of said pockets, said intermediate support plate member extending into said web and away from the pockets in opposite directions so that it overlaps said lower support plate member.

2. The honeycomb panel structure of claim 1, wherein said intermediate support plate member overlaps said lower support plate member a distance greater than 50 mm.

3. The honeycomb panel structure of claim 2, wherein said intermediate support plate member overlaps said lower support plate member a distance greater than 100 mm.

4. The honeycomb panel structure of claim 1, wherein said upper, lower and intermediate support plate members are adhesively bonded to said web.

* * * * *